(12) United States Patent
Joseph et al.

(10) Patent No.: US 10,920,706 B2
(45) Date of Patent: Feb. 16, 2021

(54) METHOD FOR ESTIMATING A PHYSICAL STOPPAGE OF A MOTOR VEHICLE INTERNAL COMBUSTION ENGINE

(71) Applicants: CONTINENTAL AUTOMOTIVE FRANCE, Toulouse (FR); CONTINENTAL AUTOMOTIVE GMBH, Hanovre (DE)

(72) Inventors: Fabien Joseph, Castanet Tolosan (FR); Benjamin Marconato, Villeneuve Tolosane (FR); Stéphane Eloy, Tournefeuille (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/466,757

(22) PCT Filed: Dec. 12, 2017

(86) PCT No.: PCT/FR2017/053514
§ 371 (c)(1),
(2) Date: Jun. 5, 2019

(87) PCT Pub. No.: WO2018/109357
PCT Pub. Date: Jun. 21, 2018

(65) Prior Publication Data
US 2019/0301389 A1    Oct. 3, 2019

(30) Foreign Application Priority Data
Dec. 13, 2016  (FR) .................................... 16 62356

(51) Int. Cl.
*F02D 41/24* (2006.01)
*F02D 41/00* (2006.01)
(Continued)

(52) U.S. Cl.
CPC ....... *F02D 41/2403* (2013.01); *F02D 41/009* (2013.01); *F02D 41/042* (2013.01);
(Continued)

(58) Field of Classification Search
CPC .... F02D 41/24; F02D 41/2403; F02D 41/009; F02D 41/042; F02D 2041/0095;
(Continued)

(56) References Cited

U.S. PATENT DOCUMENTS 7,171,948 B2 * 2/2007 Shimoyama ............ F02P 1/086
                                                    123/406.53
9,573,588 B2 * 2/2017 Aoki ..................... B60W 20/50
(Continued)

OTHER PUBLICATIONS

International Search Report, dated Feb. 13, 2018 from corresponding PCT/FR2017/053514 application.

*Primary Examiner* — Hieu T Vo
(74) *Attorney, Agent, or Firm* — Nixon & Vanderhye

(57) ABSTRACT

Disclosed is a method for estimating a physical stoppage of an engine of a motor vehicle, subject to bounce-back, a target equipped with teeth being borne by the crankshaft and successive passes of the teeth past a sensor being detected, a first time count incrementing since a last detection of the passing of a tooth and being associated with a first time threshold with the first count being reset to zero when the time between passes of two successive teeth is below the first threshold. A second count associated with a second time threshold is performed, with this count being suspended when and for as long as a time between the passes of two successive teeth is below the second threshold, the engine being estimated to have stopped as soon as the counts have respectively reached the first and second thresholds.

20 Claims, 2 Drawing Sheets

(51) Int. Cl.
  *F02N 11/08* (2006.01)
  *F02D 41/04* (2006.01)
(52) U.S. Cl.
  CPC .. *F02N 11/0844* (2013.01); *F02D 2041/0095* (2013.01); *F02D 2200/021* (2013.01); *F02D 2200/101* (2013.01); *F02D 2250/06* (2013.01); *F02N 11/0814* (2013.01); *F02N 11/0822* (2013.01); *F02N 2200/021* (2013.01); *F02N 2200/102* (2013.01); *F02N 2250/04* (2013.01); *Y02T 10/40* (2013.01)
(58) Field of Classification Search
  CPC ............. F02D 22/021; F02D 2200/101; F02D 2250/06; F02N 11/0844; F02N 11/0814; F02N 11/0822; F02N 2200/21; F02N 2200/102; Y02T 10/48
  See application file for complete search history.

(56) References Cited

U.S. PATENT DOCUMENTS

2009/0265085 A1  10/2009  Hori
2013/0325246 A1  12/2013  Roessle et al.

\* cited by examiner

METHOD FOR ESTIMATING A PHYSICAL STOPPAGE OF A MOTOR VEHICLE INTERNAL COMBUSTION ENGINE

The present invention relates to a method for estimating a physical stoppage of an internal combustion engine of a motor vehicle through the stopping of rotation of a crankshaft driven by the engine. An angular marker borne by the crankshaft is detected for each revolution of the crankshaft and a first time count increments since the last detection of passage of the angular marker, the first count being associated with a first threshold for the time between two detections of the angular marker. Such an engine with zero rotation of the crankshaft is then said to have stalled or to have been physically stopped.

BACKGROUND OF THE INVENTION

It is known practice to equip the crankshaft of an internal combustion engine with a target with an angular marker of which each pass as the crankshaft rotates is detected by a crankshaft position sensor. The target often takes the form of a gear wheel comprising, by way of angular marker, a space on the periphery of the gear wheel, which space is created by the removal of at least one tooth.

A crankshaft position sensor located a small distance away from the gear wheel delivers a signal which serves to count the teeth and therefore make it possible to determine the rotational speed of the crankshaft when the position sensor is associated with a time counter. The signal is processed by a processing unit comprising a microprocessor which may have stored in it a model of how the engine behaves in the stopped phase referred to as stalled phase.

The detection that the engine is stalled is made when the time following the passing of the angular marker of the target borne by the crankshaft exceeds a threshold that can be calibrated, typically around 250-300 milliseconds. It is then estimated that the crankshaft is therefore rotating too slowly and that the engine has stopped.

The fact that the engine has stopped needs to be detected reliably so that the starter can be engaged. However, as the engine may bounce back, causing the engine to turn over in the other direction of rotation, the threshold for determining that the engine has stopped is too long because it is based only on the last pass of the angular marker of the target borne by the crankshaft.

Specifically, when the engine stalls, the crankshaft may rotate back and forth about the stopping point thereof, thereby falsifying the measurements because the angular marker passes back and forth past the sensor. It is very important to reduce this time period while at the same time not making false identifications of stalling.

This is of crucial importance when the motor vehicle is a hybrid vehicle and/or is a vehicle equipped with a stop/start system that automatically stops and restarts the internal combustion engine of the vehicle. In the case of a hybrid vehicle, the internal combustion engine is stopped and vehicle propulsion is then provided by an auxiliary motor other than by internal combustion, usually an electric motor. However, the internal combustion engine needs to be ready to be restarted in order to produce additional power or to take over from the electric motor.

A system for automatically stopping and restarting the engine, also known as an STT (Stop and Start) system, is characterized by the stopping of the engine just before and during the immobilization of the vehicle, for example at traffic lights or in traffic jams. It is switched back on again automatically and instantaneously upon "release" of the brake pedal when the driver wishes to pull away again for example. This system therefore consists in making the engine stall when it is not needed and in restarting it as soon as the driver so wishes.

A vehicle equipped with such a system is therefore subjected to frequent stoppages of its internal combustion engine, which are followed after a more or less brief wait, by restarts. It may also happen that the driver changes his mind and requires a restart when the engine is in the process of stalling. This is referred to as a change of mind, and corresponds for example to a stopping of the engine at a red light, followed by a restart, the light having changed back to green.

Thus, in the instances of change of mind, notably in the case of applications to an internal combustion engine automatic stop/start system, the restarting of the engine can be hastened by activating the starter. This is unsatisfactory when considering the pollution created and the additional fuel consumption.

Document US 2009/265085 A1 relates to a device that makes it possible quickly to determine that an internal combustion engine has stopped and prevent erroneous determination of starting. According to that document, in a device for determining a stoppage equipped with a detection unit which detects the direction of rotation of the crankshaft of an internal combustion engine, the internal combustion engine is determined to have stopped in instances in which a signal coming from the detection unit input over a predetermined time or in instances in which a direction-of-rotation signal coming from the detection unit is constantly inverting three times or more.

The problem underlying the present invention is that of improving the speed and determination of the fact that a motor vehicle internal combustion engine has stopped while at the same time not making erroneous determinations of stoppage if the engine bounces back, resulting in material terms by the crankshaft rotating back and forth about a position of equilibrium.

SUMMARY OF THE INVENTION

To this end, the present invention relates to a method for estimating a physical stoppage of an internal combustion engine of a motor vehicle with a stoppage of the rotation of a crankshaft driven by the engine, the engine being subjected to at least one bounce-back during a stopping phase that temporarily reverses the rotation of the crankshaft, a target equipped with teeth being borne by the crankshaft and successive passes of the teeth past a sensor being detected as the crankshaft rotates, a first time count incrementing since a last detection of the passing of a tooth, the first count being associated with a first time threshold with the first time count being reset to zero when the time between passes of two successive teeth is below the first time threshold, characterized in that a second time count is performed, the second time count incrementing below a predetermined engine speed threshold and being associated with a second time threshold with the second time count being suspended when and for as long as a time between the passes of two successive teeth is below the second time threshold, the engine being estimated to have stopped as soon as the first and second time counts have respectively reached the first and second time thresholds, the second time count being reset to zero if the engine is detected to be starting with a time elapsed between two detected consecutive passes below the second time threshold and a direction of rotation of the crankshaft being in a direction of forward progress of the vehicle, an engine speed averaged over a predetermined number of successive teeth being higher than the predetermined engine speed threshold.

The objective is to improve drivability for more rapid restarts, notably in the case of a change of mind, for a motor vehicle internal combustion engine automatic stop/start system.

In the event of a stoppage with one or more engine bounce backs, it might be possible to save around 100 milliseconds or even more in detecting that the engine has stalled, while at the same time avoiding false estimates.

The first threshold considered by the prior art for the first count can be lowered in the context of the implementation of the present invention. It is the second count which serves to protect against false estimates by not allowing an estimate that the engine has stopped to be delivered as long as this second count has not reached its associated second threshold.

This is because the first count may be corrupted by engine bounce-backs. A bounce-back corresponds to a reverse rotation of the engine when the engine is in the process of stalling and no longer has enough inertia to get past the next top dead center. The engine thus oscillates about its point of equilibrium with back and forth movements of progressively reducing amplitude before physically stopping.

Advantageously, the engine speed threshold is 100 revolutions per minute.

Advantageously, the second time threshold is higher than the first time threshold.

Advantageously, the first time threshold is equal to 125 milliseconds and the second time threshold is equal to 250 milliseconds.

Advantageously, the first and second time thresholds can be calibrated.

Advantageously, the second threshold is dependent on the temperature of the engine. The hotter the engine, the less friction there will be. Therefore, the engine will have a greater tendency to oscillate and bounce back and forth.

The invention also relates to a motor vehicle comprising an internal combustion engine, a crankshaft being driven by the engine, the crankshaft bearing a target, coaxial with the crankshaft and having teeth at its periphery and an angular marker, the rotation of the target being monitored by a crankshaft position sensor that transmits its measurements to a processing unit, characterized in that physical stoppage of the engine is performed by such an estimating method, the processing unit comprising first and second counters that respectively perform the first and second time counts.

Advantageously, the target is a gear wheel and the angular marker is a tooth referred to as a long tooth which is obtained by omitting at least one tooth of the wheel.

Advantageously, the motor vehicle is equipped with an automatic stop/start system for its internal combustion engine and/or is a hybrid vehicle.

BRIEF DESCRIPTION OF THE DRAWINGS

Other features, objects and advantages of the present invention will become apparent upon reading the detailed description that will follow and upon examining the appended drawings, given by way of nonlimiting examples and in which.

DETAILED DESCRIPTION OF THE PREFERRED EMBODIMENTS

The invention relates to a method for estimating a physical stoppage of an internal combustion engine of a motor vehicle, characterized by the stopping of rotation of a crankshaft driven by the engine. The invention also relates to a motor vehicle comprising an internal combustion engine for implementation of this estimating method.

Figure 1:
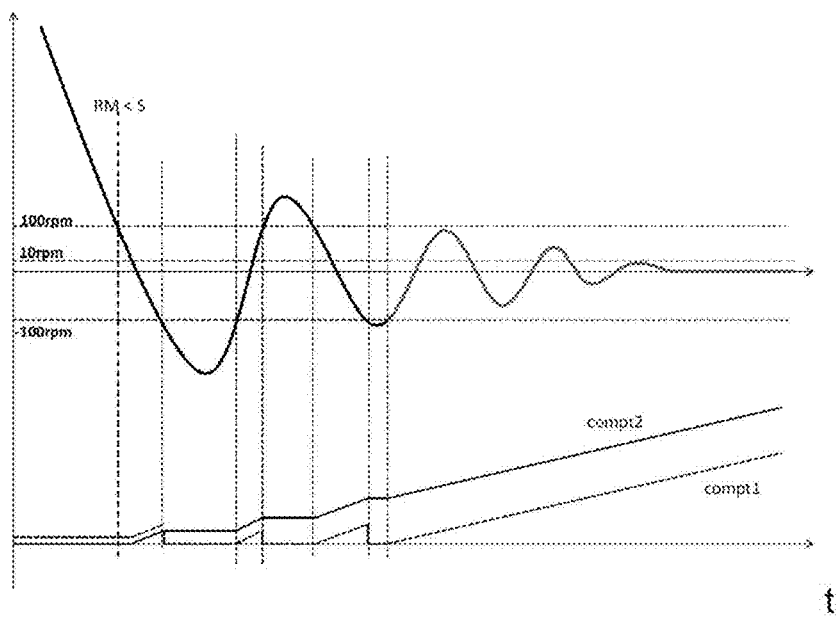
FIG. 1 is a schematic depiction of a curve of engine speed as a function of time for an internal combustion engine in a stopping phase, the curve forming a sinusoid because of the bounce-back of the engine, the sinusoid becoming damped during the course of the stopping phase.

The internal combustion engine is subjected to at least one bounce-back during a stopping phase that temporarily reverses the rotation of the crankshaft. This is shown in FIG. 1 which gives an engine speed RM as a function of time t during a phase of stopping of the engine. It is shown that the rotation of the crankshaft oscillates sinusoidally about a stoppage point of equilibria which is progressively achieved as the sinusoid becomes damped.

The engine speed during a phase of physical stoppage may vary between +100 rpm and −100 rpm (revolutions per minute). The +10 rpm limit is indicative of an engine which physically stops very shortly and the threshold S of 100 rpm may be indicative of an internal combustion engine at the start of the physical stoppage phase for engine speed RM values below this threshold S, which manifests as RM<S.

As is known, the internal combustion engine drives the rotation of a crankshaft bearing a target. The target borne by the crankshaft is equipped with teeth and successive passes of the teeth past a sensor as the crankshaft rotates are detected.

Figure 2:
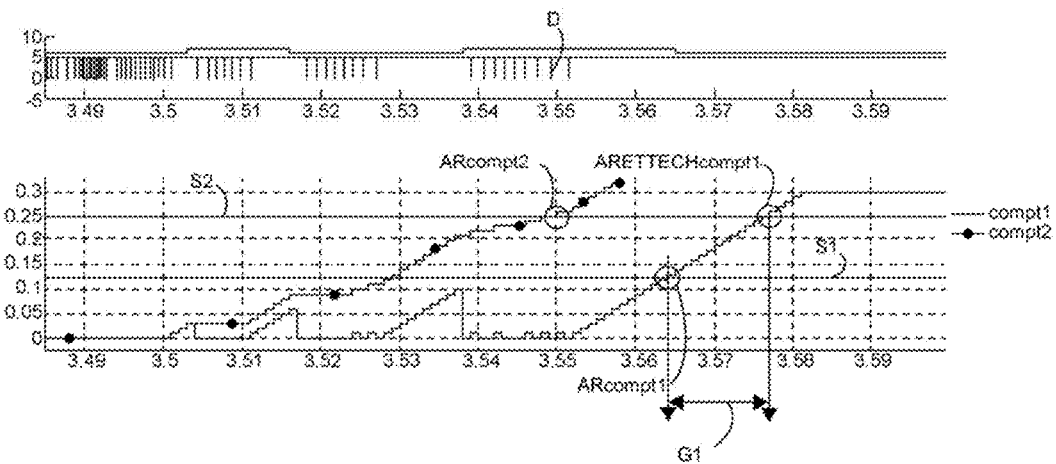
FIGS. 2 and 3 show first and second time counts from the passes of teeth of a target borne by a crankshaft associated with the internal combustion engine, these first and second time counts forming part of the method for estimating a stoppage of the engine according to the present invention by having respective time thresholds, a time count according to the prior art also being shown in these figures by way of comparison.
Figure 3:
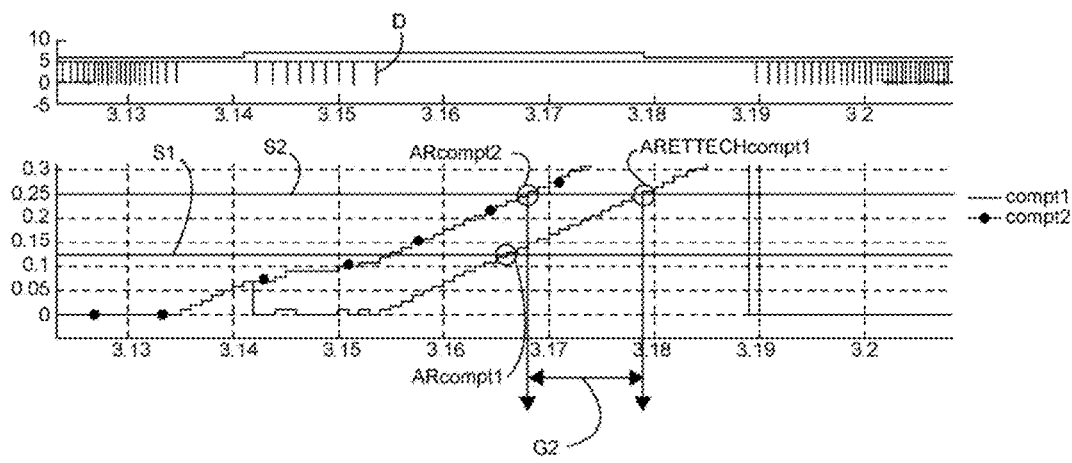

As can be seen in FIGS. 1 to 3, and more particularly in FIGS. 2 and 3, a first time count compt1 increments since a last detection of the passing of a tooth D, each detection of the passing of a tooth being symbolized by a small vertical line at the top of FIGS. 2 and 3, and a single reference D being used in these figures, although it applies to each of the passes of teeth.

The first count compt1 is associated with a first time threshold S1 which is referenced S1 in the method according to the invention and S2 in the prior art. The first time count compt1 is reset to zero when the time between the passes of two successive teeth is below the first time threshold S1. This is illustrated by the downward vertical line in the curve of the first count compt1. In FIGS. 2 and 3, the vertical lines in the first count compt1 are not as numerous as the passes of teeth D in the top of the figures, given that the resolutions for these counts and the passes of teeth are different.

According to the invention, a second time count compt2 is performed. The second time count compt2 increments below a predetermined engine speed threshold S, for example 100 revolutions per minute, the threshold S having been shown in FIG. 1. The second time count compt2 is associated with a second time threshold S2 with the second time count compt2 being suspended when and for as long as a time between the passes of two successive teeth is below the second time threshold S2.

The engine is considered to have stopped, also referred to as stalled, once the first and second time counts compt1, compt2 have respectively reached the first and second time thresholds S1, S2.

The second count compt2 is not reset to zero when the passing of a new tooth is detected, but is merely temporarily suspended. This second count compt2 resumes for example when engine speeds drop back below the speed threshold, for example 100 revolutions per minute. This may correspond to a tooth being seen in a time window longer than a predetermined length of time.

The exceeding of a speed threshold results in the first count compt1 being reset to zero or in the suspension of counting of the second time count compt2.

FIG. 1 for example shows that the first count compt1 is reset to zero and that the second count compt2 is stopped without being reset to zero as soon as the engine speed drops below −100 revolutions per minute, then the first and second counts compt1 and compt2 are restarted as soon as the engine speed returns to an engine speed window of between −100 and +100 revolutions per minute, before being interrupted again whenever the engine speed is above 100 revolutions per minute or below −100 revolutions per minute.

The first and second time counts compt1, compt2 respectively reach the first and second time thresholds S1, S2 at different times. It is therefore the count that is last to reach its associated threshold that defines the moment at which the engine physically stops.

In FIGS. 2 and 3, the point of intersection of the second count compt2 with the second threshold S2 is referenced ARcompt2, the point of intersection of the first count compt1 with the first threshold S1 considered in the context of the present invention is referenced ARcompt 1 and the point of intersection of the first count compt1 with the first threshold previously considered by the prior art and which is different from that S1 considered in the context of the present invention is referenced ARETECHcompt1.

In FIGS. 2 and 3, the second threshold S2 for the second count compt2 corresponds to the first threshold S1 previously considered by the prior art for the first count, but such is not necessarily the case.

In FIG. 2, it is the first time count compt1 that is last to reach its associated first threshold S1. It is therefore this instant at which the first time count compt1 reaches the first threshold S1 that is considered to be the instant at which the engine stops. Because the first threshold S1 considered in the context of the present invention, in this instance 125 milliseconds, had been reduced in comparison with the first threshold S1 previously considered by the prior art, in FIG. 2 equal to the second threshold S2 and to 250 milliseconds, the gain G1 obtained in this case by the present invention in relation to the prior art is 125 milliseconds.

In FIG. 3, it is the second time count compt2 that is last to reach its associated second threshold S2. It is therefore this instant at which the second time count compt2 reaches the second threshold S2 that is considered to be the instant at which the engine stops. Because the second threshold S2 considered in the context here, in this instance 250 milliseconds, is reached by the second count compt2 before the first threshold S1 previously considered by the prior art for the first count compt1, also equal to 250 milliseconds, the gain G2 obtained in this case by the present invention is approximately 110 milliseconds.

The target and the angular marker may be any, but it is preferable for the target to be a gear wheel or toothed disk. In another alternative form of embodiment, the target may be made of a magnetic material having alternating south and north poles. For any selected target, there is a corresponding appropriate crankshaft position sensor. The number of teeth on a target may vary. For example, this number may be equal to sixty, but this is not limiting.

The crankshaft position sensor may be of the kind that generates a magnetic field or a means of detecting a magnetic field, such as, for example, a Hall-effect cell, a magneto-resistive (MR) cell, a giant magneto-resistive (GMR) cell or the like. The position sensor comprises an electronic circuit for processing the signal received by the magnetic field detection means and delivers a digital signal to the microprocessor of a processing unit.

When this position sensor is a mono-directional sensor, the sensor exhibits the disadvantage of being unable to detect the direction of rotation of the crankshaft. Now, during stalling, the engine may change direction of rotation several times, the crankshaft being subject to bounce-back, and the count thus performed by a mono-directional sensor is completely erroneous. This leads to difficulties in precisely determining the stalling of the engine, something which implementation of the method for estimating the stopping of the engine according to the present invention partially avoids, however.

In the context of the present invention, use may also be made of a sensor other than a mono-directional sensor, for example a two-directional sensor, although this generates additional cost.

The processing unit therefore corresponds to the position sensor and can also be connected with other sensors such as an engine-temperature sensor or an external-temperature sensor. The processing unit also comprises a first tooth counter incrementing a first time count compt1, which increments from a last detection of the passing of a tooth D. In the conventional way, the first count compt1 is associated with a first threshold S1 for the time between two detections of the passing of a tooth, the first time threshold S1 being predetermined, advantageously a threshold that can be calibrated and stored in memory within the processing unit.

The processing unit used in the context of the present invention therefore comprises first and second counters respectively performing first and second time counts compt1, compt2. The processing unit comprises means for memory storage of first and second time thresholds S1 and S2, and means for estimating physical stoppage of the engine when the first and second counters reached their respective stored time threshold S1, S2.

The motor vehicle for which the estimating method can be implemented is preferably equipped with an automatic stop/start system for its internal combustion engine and/or is a hybrid vehicle.

One special case is the restarting of the internal combustion engine of the vehicle in a phase in which the engine is stopped, for example in the case of a vehicle equipped with a system for the automatic stopping/starting of the engine when the conditions have changed and a demand for the vehicle to be stopped is no longer valid, the vehicle needing to restart as quickly as possible, for example at a deliberate stop at a red traffic light which has turned back to green. It is necessary to differentiate between a bounce-back and a beginning of restart.

The second time count compt2 may be reset to zero if the engine is detected as starting with a time elapsed between two consecutive detected passes below the second time threshold S2 and a direction of rotation of the crankshaft being in the direction of forward travel of the vehicle.

In this case, an engine speed averaged over a predetermined number of successive teeth is higher than the engine speed threshold S, and this is what differentiates it from numerous bounce-backs. A passing of teeth may for example be used as a criterion to identify a restart, notably a number of passes of teeth of the target seen rapidly, for example eight teeth seen sufficiently rapidly within a predetermined time window in the case of a target comprising sixty teeth, it being possible for this time window to represent 10 milliseconds. The number of teeth in the time window may characterize an engine speed higher than 100 revolutions per minute.

As previously mentioned, the engine speed threshold S may be 100 revolutions per minute. The start of the stopping phase may therefore begin with an engine speed below 100 revolutions per minute of the engine speed. It may be envisioned that, at the start of a phase of stopping the engine, the engine speed fluctuates from +100 to −100 revolutions per minute, this being chiefly down to bounce-back.

The first time threshold S1 for the time between two passes may be equal to 125 milliseconds and the second time threshold S2 may be equal to 250 milliseconds. A second threshold S2 with a time duration equal to 250 milliseconds and associated with a speed of 100 revolutions per minute is very much representative of an internal combustion engine in the process of stalling. The first threshold S1 considered in the context of the invention may be half the first threshold S1 considered by the prior art, although this is nonlimiting.

The first and second time thresholds S1, S2 may or may not be able to be calibrated. For example, the first threshold S1 may vary from 100 to 150 milliseconds and the second threshold S2 may vary from 200 to 300 milliseconds. The first and second threshold S1, S2 may be calibrated, for example according to the internal combustion engine of the vehicle, with respect to an engine lubricating oil temperature communicated to the processing unit by a temperature sensor, which provides an estimate of the engine temperature. The hotter the oil, the less viscous it is, and the more the engine is exposed to the potential for bounce-back. This is particularly true of the second threshold S2.

Figure 4:
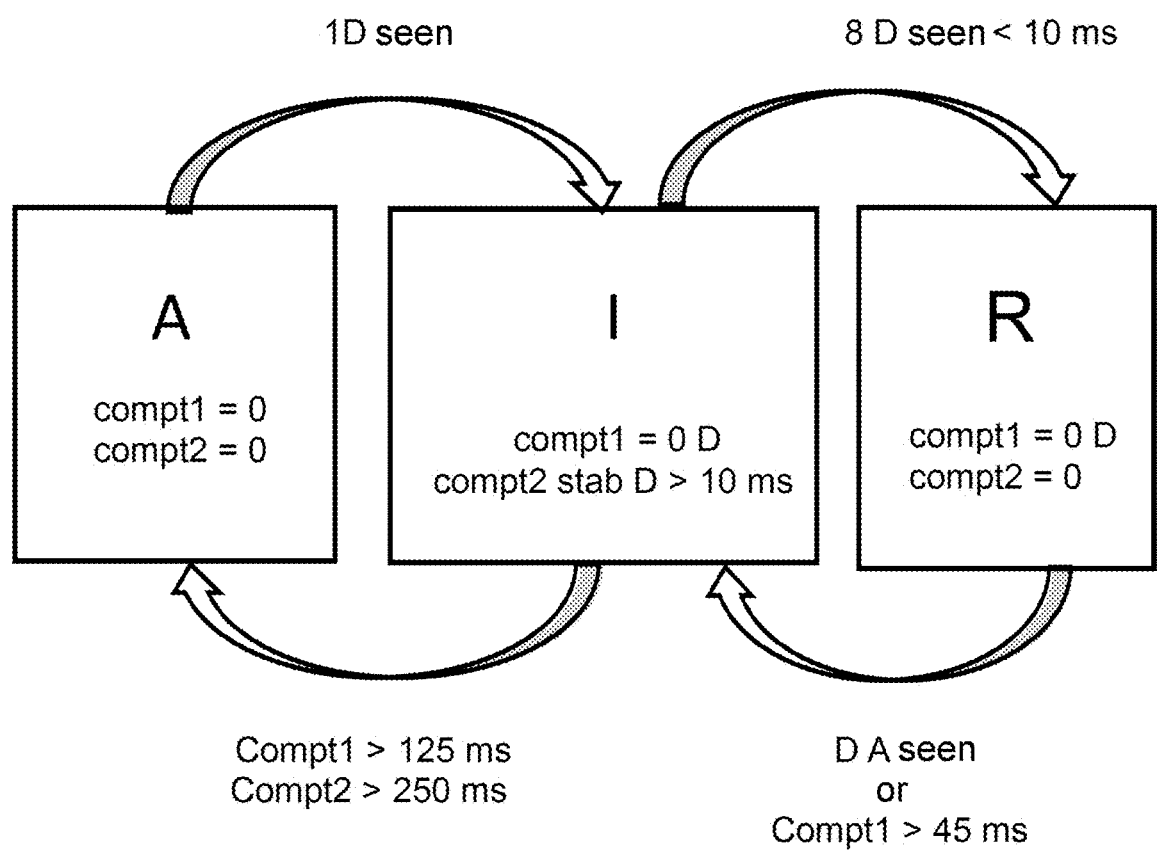
FIG. 4 shows a logic diagram for one embodiment of a method for estimating a physical stoppage according to the present invention.

FIG. 4 shows a logic diagram for one embodiment of a method for estimating a physical stoppage of an internal combustion engine of a motor vehicle. The parameters given in this figure are nonlimiting.

The internal combustion engine can adopt three different states: a stopped state A, an intermediate state I for which the engine is in the process of stopping, or rather of restarting, and a running state R, the engine running, for example at idle, at a rotational speed above a predetermined threshold, for example 100 revolutions per minute. The arrows between the states A, I and R illustrate the transitions in state with, above the arrows, the conditions for those transitions.

In the stopped state A, the two counters compt1 and compt2 are reset to zero. In the intermediate state I, the first count compt1 is reset to zero for each tooth D, whereas the second count compt2 remains stabilized and is then incremented once again if a tooth D is seen within a time threshold the duration of which may be 10 milliseconds.

The transition from the intermediate state I to the stopped state A, which is at the heart of the method according to the invention, occurs as soon as the first and second time counts compt1, compt2 have respectively reached the first and second aforementioned time thresholds which, in FIG. 4, are calibrated respectively at 125 and at 250 milliseconds, namely when compt1>125 ms and compt2>250 ms.

Conversely, the transition from the stopped state A to the intermediate state I occurs as soon as a tooth is seen again 1D seen. This is because while the engine is stopped there should no longer be any teeth detected by the sensor. If a tooth is seen, that means that the engine status is no longer the stopped state A and that the engine is moving toward an intermediate state I.

For an engine that is running R, the two counts compt1 and compt2 are reset to zero, namely compt1=0 and compt2=0, the first count compt1 being reset to zero for each tooth D seen.

The transition from the intermediate state I to the running state R occurs as soon as a predetermined number of teeth is seen by the sensor in a predetermined time duration, in FIG. 4, eight teeth in under 10 milliseconds, something which in FIG. 4 is referenced 8D seen<10 ms.

Conversely, the transition from the running state R to the intermediate state I occurs as soon as a tooth is seen again going backward, which is referenced as D A seen. This is indicative of a bounce-back. As an alternative condition, it may be considered that if the first count compt1 is above a predetermined threshold, the engine is considered to be adopting an intermediate state between a running state R and a stopped state A, with a relatively low engine speed. In FIG. 4, this predetermined threshold is 45 milliseconds and is referenced compt1>45 ms.

The present invention finds a highly advantageous application in motor vehicles subjected to frequent stopping or stalling of their internal combustion engine. This is particularly the case with hybrid vehicles and/or vehicles equipped with a stop/start system that automatically stops and restarts their internal combustion engine. It may also be extended to cover other types of vehicle, for example motor vehicles with automatic coasting.

The invention claimed is:

1. A method for estimating a physical stoppage of an internal combustion engine of a motor vehicle where the engine is subject, during stopping, to at least one bounce-back that temporarily reverses a crankshaft of the engine, said crankshaft including a target equipped with teeth, and where a sensor detects successive passes of the teeth past the sensor during rotation of the crankshaft, the method comprising:

incrementing a first time count (compt1) since a last detection of a passing of a tooth (D) of the target, the first count (compt1) being associated with a first time threshold (S1);

in the event that a time between passes of two successive teeth of the target is less than the first time threshold (S1), resetting the first time count (compt1) to zero;

incrementing a second time count (compt2) when the engine operates below a predetermined engine speed threshold (S), and suspending the second time count (compt2) when and for as long as the time between the passes of two successive teeth is below a second time threshold (S2);

upon the first and second time counts (compt1, compt2) respectively reaching the first and second time thresholds (S1, S2), determining that the engine has stopped; and upon detection that a time elapsed between two detected consecutive passes is below the second time threshold (S2) and a direction of rotation of the crankshaft is in a direction of forward progress of the vehicle, an engine speed averaged over a predetermined number of successive teeth being higher than the predetermined engine speed threshold (S), resetting the second time count (compt2) to zero and determining that the engine as starting.

2. The method as claimed in claim 1, wherein the predetermined engine speed threshold (S) is 100 revolutions per minute.

3. The method as claimed in claim 2, wherein the second time threshold is higher than the first time threshold.

4. The method as claimed in claim 3, wherein the first time threshold is equal to 125 milliseconds and the second time threshold is equal to 250 milliseconds.

5. The method as claimed in claim 2, wherein the first and second time thresholds can be calibrated.

6. A motor vehicle comprising an internal combustion engine, a crankshaft driven by the engine, and the crankshaft bearing a target that is coaxial with the crankshaft and having teeth at a periphery thereof and an angular marker, a rotation of the target monitored by a crankshaft position sensor that transmits measurements to a processing unit, wherein physical stoppage of the engine is determined by an estimating method as claimed in claim 2, the processing unit comprising first and second counters that respectively perform the first and second time counts.

7. The method as claimed in claim 1, wherein the second time threshold (S2) is higher than the first time threshold (S1).

8. The method as claimed in claim 7, wherein the first time threshold (S1) is equal to 125 milliseconds and the second time threshold (S2) is equal to 250 milliseconds.

9. The method as claimed in claim 8, wherein the first and second time thresholds can be calibrated.

10. A motor vehicle comprising an internal combustion engine, a crankshaft driven by the engine, and the crankshaft bearing a target that is coaxial with the crankshaft and having teeth at a periphery thereof and an angular marker, a rotation of the target monitored by a crankshaft position sensor that transmits measurements to a processing unit, wherein physical stoppage of the engine is determined by an estimating method as claimed in claim 8, the processing unit comprising first and second counters that respectively perform the first and second time counts.

11. The method as claimed in claim 7, wherein the first and second time thresholds can be calibrated.

12. A motor vehicle comprising an internal combustion engine, a crankshaft driven by the engine, and the crankshaft bearing a target that is coaxial with the crankshaft and having teeth at a periphery thereof and an angular marker, a rotation of the target monitored by a crankshaft position sensor that transmits measurements to a processing unit, wherein physical stoppage of the engine is determined by an estimating method as claimed in claim 7, the processing unit comprising first and second counters that respectively perform the first and second time counts.

13. The method as claimed in claim 1, wherein the first and second time thresholds (S1, S2) can be calibrated.

14. The method as claimed in claim 13, wherein the second threshold (S2) is dependent on a temperature of the engine.

15. A motor vehicle comprising an internal combustion engine, a crankshaft driven by the engine, and the crankshaft bearing a target that is coaxial with the crankshaft and having teeth at a periphery thereof and an angular marker, a rotation of the target monitored by a crankshaft position sensor that transmits measurements to a processing unit, wherein physical stoppage of the engine is determined by an estimating method as claimed in claim 14, the processing unit comprising first and second counters that respectively perform the first and second time counts.

16. A motor vehicle comprising an internal combustion engine, a crankshaft driven by the engine, and the crankshaft bearing a target that is coaxial with the crankshaft and having teeth at a periphery thereof and an angular marker, a rotation of the target monitored by a crankshaft position sensor that transmits measurements to a processing unit, wherein physical stoppage of the engine is determined by an estimating method as claimed in claim 13, the processing unit comprising first and second counters that respectively perform the first and second time counts.

17. A motor vehicle comprising an internal combustion engine, a crankshaft driven by the engine, and the crankshaft bearing a target that is coaxial with the crankshaft and having teeth at a periphery thereof and an angular marker, a rotation of the target monitored by a crankshaft position sensor that transmits measurements to a processing unit, wherein physical stoppage of the engine is determined by an estimating method as claimed in claim 1, the processing unit comprising first and second counters that respectively perform the first and second time counts (compt1, compt2).

18. The motor vehicle as claimed in claim 17, wherein the target is a gear wheel with a plurality of teeth, and the angular marker is a long tooth which is obtained by omitting at least one of the teeth of the gear wheel.

19. The motor vehicle as claimed in claim 18, equipped with an automatic stop/start system for the internal combustion engine and/or is a hybrid vehicle.

20. The motor vehicle as claimed in claim 17, equipped with an automatic stop/start system for the internal combustion engine and/or is a hybrid vehicle.

\* \* \* \* \*